Jan. 26, 1960
H. A. STEELMAN
2,922,942
PHASE CONVERSION MOTOR SYSTEM
Filed March 8, 1957
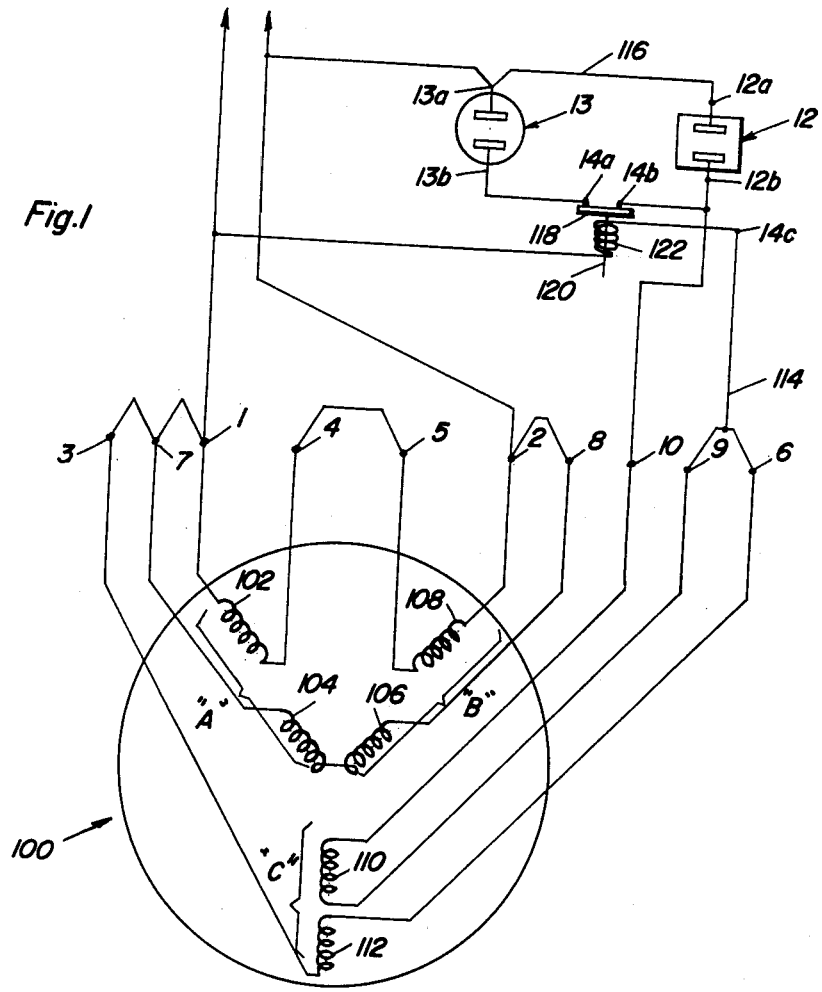
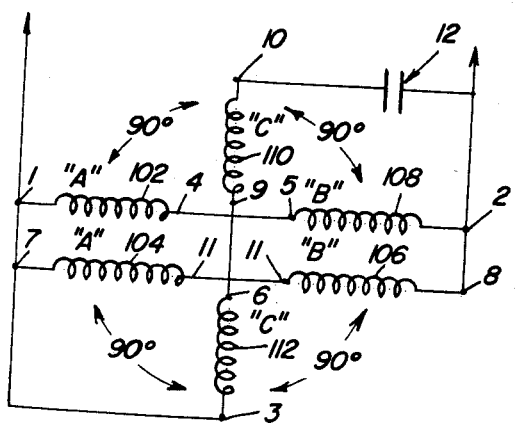
Fig.2
Henry A. Steelman
INVENTOR.
BY

United States Patent Office 2,922,942
Patented Jan. 26, 1960

2,922,942

PHASE CONVERSION MOTOR SYSTEM

Henry A. Steelman, Kilgore, Tex., assignor to Steelman Electric Motor Service, Kilgore, Tex., a partnership Application March 8, 1957, Serial No. 644,889

4 Claims. (Cl. 318—220)

This invention relates generally to a conversion system specifically designed to adapt standard three-phase motors to operate from a single-phase alternating current supply.

Today, three-phase electrical motors are generally utilized for industrial purposes because of their greater efficiency and capacity than single-phase motors. However, in many areas, three-phase electrical power is not readily available. Accordingly, it is desired to provide means for efficiently operating a conventional three-phase motor from a single-phase source.

The primary object of the invention is to provide a phase conversion system whereby three-phase motor rated performance and efficiency is delivered by the motor when run from a single phase alternating current source. It is known, of course, that three-phase motors have been run from single-phase sources prior to this invention. However, the particular advantages of the invention herein lie in the achievement of the rated nameplate performance of the three-phase motor from the single phase source.

In accordance with the teachings of the invention, to be more particularly described below, a conventional dual voltage 220/440 volt three-phase Y connected motor is adapted for efficient operation from a single-phase source. Each of the three-phase windings include identical first and second winding sections. A first section from A phase is serially connected with a first section from B phase and connected directly across the single phase line. A second section from A phase and a second section from B phase are also serially connected and placed across the single phase lines in parallel with the first sections above recited. The first and second sections of the C phase are serially connected along with an oil filled capacitor across the single phase source. It is to be noted that the C phase is completely isolated from the A and B phase. With this arrangement, the motor operates substantially as a two-phase motor with the A and B phases constituting one winding and the C phase constituting a second winding 90° out of phase therewith. It is to be noted that, as arranged, the combination of the winding sections of A and B phase form a path which has a lower resistance and a higher inductance than the C phase winding. This arrangement allows a smaller oil filled capacitor to be utilized while still achieving a high power factor and efficiency. Also, the parallel path formed by the winding sections of A and B phase offer a smaller resistance and accordingly there is less power loss due to resistance drop.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 illustrates the motor terminal connections to be made in accordance with the teachings of this invention on a conventional dual voltage three-phase motor operated from a single-phase supply; and Figure 2 represents the phase relationship between the phase windings.

With continuing reference to the drawings, the numeral 100 represents schematically the stator winding of a conventional dual voltage motor modified in accordance with the teachings of this invention. Three-phase windings, A, B and C, are illustrated, and each include a pair of winding sections respectively designated as 102 and 104, 106 and 108, and 110 and 112. Conventionally, the motor is provided with nine output terminals, designated as 1, 2, 3, 4, 5, 6, 7, 8 and 9. When utilizing the conventional motor from a 220 volt three-phase source, the winding section of each phase are placed in parallel across the three phase source. When utilizing the motor with a 440 volt three-phase source, the winding sections of each of the phase windings are placed in series across the source. It is to be appreciated that prior to modification in accordance with the teachings of this invention winding section 104 of phase A and winding section 106 of phase B and winding section 110 of phase C were connected at the center point of the star or Y. In accordance with the teachings of this invention, winding section 110 of phase C is isolated from winding sections 104 and 106 of phases A and B respectively and the winding is brought out to a terminal designated as 10, not conventionally found on standard motors.

As is illustrated in Figure 1, winding section 102, connected between terminals 1 and 4 is serially connected to winding section 108 of phase B, connected between terminals 2 and 5, by bridging terminals 4 and 5. Further, winding section 104 of phase A and winding section 106 of phase B are serially connected between terminals 7 and 8. The series circuit of 102 and 108 is then paralleled with the series circuit of 104 and 106 by bridging terminals 1 and 7 and terminals 2 and 8.

Winding section 112 of phase C which is connected between terminals 3 and 6 is serially connected to winding section 110, now connected between terminals 9 and 10 by bridging terminals 6 and 9. Terminals 3 and 7 are also bridged. A conductor 114 extends from terminal 9 to terminal 12b and an oil filled capacitor 12 is connected between terminal 12b and terminal 12a. A conductor 116 connects terminal 12a to one side of the single-phase A.C. source. The single-phase A.C. source, indicated by $L_1$ and $L_2$, is connected between terminals 1 and 2 as is illustrated in Figure 1. It is to be noted that phase C has been completely isolated from phase A and B. A starting capacitor 13 is electrically connected between terminal 13a and 13b and in parallel with the above filled capacitor 12 across the normally closed terminal 14a and 14b. The bridging element 118 carried by an armature 120 associated with a solenoid coil 122 is positioned so as to bridge the normally closed terminals 14a and 14b. The solenoid coil 122 electrically extends between terminal 14c and one side of the single-phase A.C. source $L_1$. The starting capacitor 13 is conventional and forms a part of the circuit when the motor is originally actuated but however when the motor approaches rated speed, the solenoid 122 is energized to draw armature 120 and bridging element 118 out of engagement with the terminals 14a and 14b.

Now referring to Figure 2, the phase relationship of the resultant windings will be appreciated. It will be seen that the windings as now formed are virtually the same as in a two-phase motor except that the path formed by the combination of phases A and B, since it includes parallel windings, is of a lower resistance and higher inductance than the path formed by the winding sections of phase C. As noted above, due to the increased inductance of the path formed by the combination of A and B phases, the capacitor 12 may be significantly reduced in size and capacity so as to make the motor and conversion system of a feasible size and cost. It is again stressed and will be appreciated that besides the increase inductance achieved by paralleling the path formed by the A and B winding sections as illustrated, a decrease in resistance will result in accordance with basic electric laws concerning resistances in parallel.

It will be appreciated that the rotational direction of the motor may be reversed by interchanging the motor leads $L_1$ and $L_2$ relative to the terminals 3 and 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A motor particularly adapted for efficient operation from a single phase power supply comprising three identical phase windings wherein each of said phase windings includes identical first and second winding sections, said first sections of two of said three windings connected in series, said second sections of said two of said three windings connected in series, said series connected first sections connected in parallel with said series connected second sections across said single phase source, said first and second sections of a third of said three phase windings connected in series, said third of said three-phase windings isolated from said two of said three-phase windings, a capacitor connected in series with said third of said three-phase windings in series across said single-phase source.

2. The combination of claim 1 wherein means are provided for temporarily connecting a starting capacitor in series with said third of said three phase windings for automatically disconnecting said starting capacitor from said third phase winding upon the development of rated speed of said motor.

3. The combination of claim 2 wherein said means includes an electromagnetic coil connected in parallel with a portion of said third winding, a normally closed switch serially connected to said starting capacitor responsive to the energization of said electromagnetic coil.

4. The combination of claim 3 wherein said starting capacitor is connected in parallel with said first named capacitor.

References Cited in the file of this patent

FOREIGN PATENTS

| | | |
|---|---|---|
| 710,024 | Germany | Sept. 2, 1941 |
| 968,992 | France | May 10, 1950 |
| 472,019 | Canada | Mar. 6, 1951 |
| 151,965 | Sweden | Oct. 18, 1955 |

OTHER REFERENCES

"Phase Conversion" from the Electrical Review, July 7, 1944, page 16.